(No Model.)
D. H. KATHAN.
ANIMAL STOCK.
No. 369,061. Patented Aug. 30, 1887.
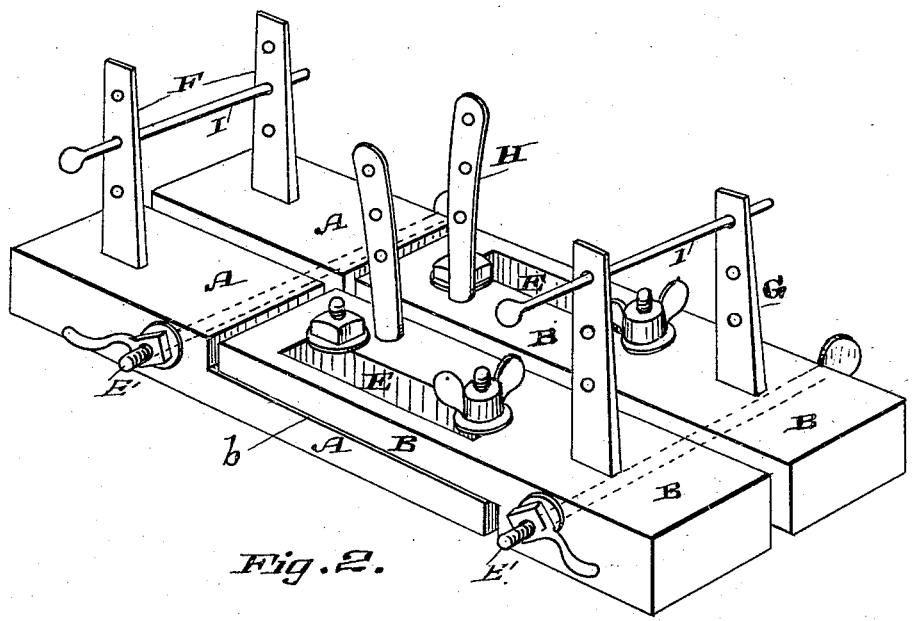
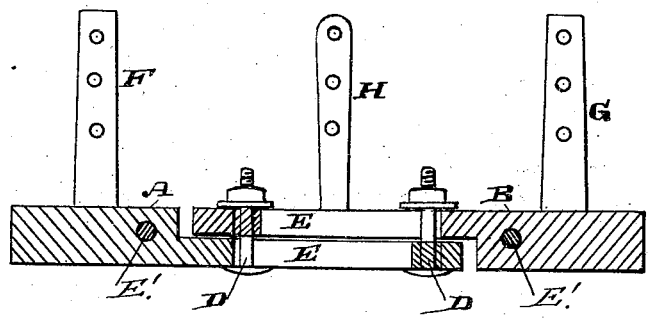
Witnesses,
Geo. H. Strong.
J. H. Rouse
Inventor,
D. H. Kathan
By Dewey & Co.
attys

UNITED STATES PATENT OFFICE.

DANIAL H. KATHAN, OF DAVISVILLE, CALIFORNIA.

ANIMAL-STOCK.

SPECIFICATION forming part of Letters Patent No. 369,061, dated August 30, 1887.

Application filed May 6, 1887. Serial No. 237,363. (No model.)

*To all whom it may concern:*

Be it known that I, DANIAL H. KATHAN, of Davisville, Yolo county, State of California, have invented an Improvement in Animal-Stocks; and I hereby declare the following to be a full, clear, and exact description of the same.

My invention relates to a device for securely holding animals while operations are being performed upon them.

It consists of a base or support formed in sections, with uniting pins or guides, so that it may be extended either longitudinally or transversely, and in combination with this of a series of posts fixed in the movable sections, between which animals of different sizes may be held, with pins for securing them in any desired position.

Referring to the accompanying drawings for a more complete explanation of my invention, Figure 1 is a view of the device closed to its smallest extent. Fig. 2 is a vertical sectional view of the same.

A A and B B are the base-sections, which may be formed of plank of any suitable width and thickness, and they are fitted together by overlapping joints, as shown at $b$, so that the sections A and B may slide upon each other and be extended longitudinally. In order to hold them in the proper position and guide them in these movements, I employ bolts or pins D, which extend down through slots E in the parts B, the lower ends being firmly secured in the parts A beneath at the same time. Similar bolts or pins pass from the bottom upward through slots in the parts A, and are secured in the parts B, the two sets of pins forming guides, upon which the device may be extended longitudinally. The two sets A and B are separated through the center longitudinally, and these are also united by transverse rods or bars E', which extend through them and hold them in position transversely. The parts may be separated transversely, sliding upon these bars or rods, and may be held at any desired point, either by the friction on the rods fitting snugly in the holes or, preferably, by nuts or other devices.

In the upper surface of the parts A are fixed two stout wooden posts, F, having a number of holes made transversely, through which pins may be passed at any desired point. Upon the part B are similar posts, G, with holes for pins passing through them in the same manner. Another set of posts, H, are adjustably fixed in the part B, intermediate the posts F and G. These latter may be made of wood or iron, and may be removed and replaced at will. When it is desired to hold any animal, such as a hog, for any necessary operation, the animal is laid upon his back between either the posts G and H or F and H, or, if a large animal, between F and G, the posts H being removed in such a case, and is held in place in any desired position by means of the transverse pins or bars I, which pass through the holes in the vertical standards, thus securing the animal firmly while the operation is in progress. If the animal be larger than the space between the posts F and G, the device may be extended by means of the sliding portions, as before described, until it is of the proper size for any animal to be operated upon.

Having thus described my invention, what I claim as new, and desire to secure by Letters Patent, is—

1. In a device for holding animals, the laterally and longitudinally adjustable sections united by pins or bolts, in combination with vertical posts carried by said sections and holding the animals, substantially as herein described.

2. In a device for holding animals, the sections A and B and the pins or bolts whereby they may be laterally and longitudinally adjusted, in combination with the vertical posts F and G, carried by said sections, other posts, H, intermediate said posts F and G, and the rods passing between each pair of posts, substantially as herein described.

In witness whereof I have hereunto set my hand.

DANIAL H. KATHAN.

Witnesses:
GEO. H. STRONG,
S. H. NOURSE.